(12) United States Patent
Braley et al.

(10) Patent No.: US 10,435,134 B2
(45) Date of Patent: Oct. 8, 2019

(54) CORE STRUCTURES FOR COMPOSITE PANELS OF AN AIRCRAFT, COMPOSITE PANELS AND AIRCRAFT INCLUDING THE CORE STRUCTURES, AND METHODS OF MANUFACTURING THE COMPOSITE PANELS

(71) Applicant: The Boeing Company, Chicago, IL (US)

(72) Inventors: Daniel Joseph Braley, St. Peters, MO (US); Brett I. Lyons, Burien, WA (US); Thomas Joseph Gonze, North Charleston, SC (US); Trevor E. Tucker, Seattle, WA (US); Janet Mary Wick, Tacoma, WA (US); Eric Eldon Deck, Ladue, MO (US); Garrett B. Peters, St. Louis, MO (US); Nicole Renee Williams, O'Fallon, MO (US); Andrew Lawrence Bauer, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 15/838,855

(22) Filed: Dec. 12, 2017

(65) Prior Publication Data
US 2019/0176957 A1 Jun. 13, 2019

(51) Int. Cl.
*H01Q 1/28* (2006.01)
*B64C 1/36* (2006.01)
(Continued)

(52) U.S. Cl.
CPC .............. *B64C 1/36* (2013.01); *B33Y 10/00* (2014.12); *B33Y 80/00* (2014.12); *B64C 1/12* (2013.01);
(Continued)

(58) Field of Classification Search
CPC .......... H01Q 1/28; H01Q 1/287; H01Q 1/285; H01Q 1/286; H01Q 11/10; H01Q 13/10;
(Continued)

(56) References Cited

U.S. PATENT DOCUMENTS 4,392,139 A * 7/1983 Aoyama .............. H01Q 25/002
343/705
6,630,093 B1 10/2003 Jones
(Continued)

OTHER PUBLICATIONS

Stratysis, FDM Technology: 3D Print Durable Parts With Real Thermoplastic, downloaded from stratysis.com on Aug. 17, 2017.
(Continued)

*Primary Examiner* — Linh V Nguyen
(74) *Attorney, Agent, or Firm* — Dascenzo Intellectual Property Law, P.C.

(57) ABSTRACT

Core structures (120) for composite panels (75) of an aircraft (10), composite panels (75) and aircraft (10) including the core structures (120), and methods (200) of manufacturing the composite panels (75) are disclosed herein. The core structures (120) include a first side (140), a second side (150), and a connecting region (160) that interconnects an upper portion (142) of the first side (140) with an upper portion (152) of the second side (150). The first side (140), the second side (150), and the connecting region (160) at least partially define an antenna housing (62), which defines a housing volume (64) configured to contain an aircraft antenna (60) of the aircraft (10), and an electromagnetic wave transmission region (66) configured to permit electromagnetic waves to pass therethrough. The electromagnetic wave transmission region (66) defines a plurality of kite-shaped voids (130) arranged in a repeating pattern and bounded by a corresponding plurality of walls (170), at least 10% of which extends at least substantially perpendicular to
(Continued)

a surface (122/124) that bounds the electromagnetic wave transmission region (66).

20 Claims, 5 Drawing Sheets (51) Int. Cl.
| | |
|---|---|
| *B64C 1/12* | (2006.01) |
| *B64C 5/02* | (2006.01) |
| *H01Q 1/36* | (2006.01) |
| *H01Q 1/52* | (2006.01) |
| *B33Y 80/00* | (2015.01) |
| *B64C 3/26* | (2006.01) |
| *B64C 5/06* | (2006.01) |
| *B33Y 10/00* | (2015.01) |
| *B64C 1/00* | (2006.01) |

(52) U.S. Cl.
CPC ............ *B64C 3/26* (2013.01); *B64C 5/02* (2013.01); *B64C 5/06* (2013.01); *H01Q 1/287* (2013.01); *H01Q 1/36* (2013.01); *H01Q 1/52* (2013.01); *B64C 2001/0072* (2013.01)

(58) Field of Classification Search
CPC . H01Q 1/283; H01Q 1/52; H01Q 1/36; B64C 2001/0072; B64C 5/02; B64C 1/12; B64C 1/36; B33Y 80/00
USPC ................................................ 343/705, 702
See application file for complete search history.

(56) References Cited

U.S. PATENT DOCUMENTS

| | | | | |
|---|---|---|---|---|
| 9,567,104 | B2* | 2/2017 | Sweers | G01M 5/0016 |
| 2002/0096599 | A1* | 7/2002 | McDermott | B64B 1/08 244/25 |
| 2008/0179448 | A1* | 7/2008 | Layland | B64D 15/12 244/1 N |
| 2015/0321441 | A1* | 11/2015 | Marcoe | B32B 1/08 87/9 |
| 2015/0360766 | A1* | 12/2015 | Gerber | B64C 5/06 244/87 |
| 2016/0077027 | A1* | 3/2016 | Sweers | G01M 5/0016 324/654 |
| 2016/0114883 | A1* | 4/2016 | Guerry | B08B 17/065 244/200 |
| 2016/0294043 | A1* | 10/2016 | Pascual Gil | H01Q 1/287 |
| 2017/0302006 | A1* | 10/2017 | Lavin | H01Q 1/287 |
| 2017/0346169 | A1* | 11/2017 | Wang | H01Q 13/22 |
| 2018/0166781 | A1* | 6/2018 | Snyder | H01Q 1/282 |
| 2019/0030872 | A1* | 1/2019 | Bauer | B32B 5/12 |

OTHER PUBLICATIONS

Stratysis, Avridyne Technologies: Sandwich Composite Production Cost Reduced 52% with Direct Digital Manufacturing, downloaded from stratysis.com on Aug. 17, 2017.

* cited by examiner

CORE STRUCTURES FOR COMPOSITE PANELS OF AN AIRCRAFT, COMPOSITE PANELS AND AIRCRAFT INCLUDING THE CORE STRUCTURES, AND METHODS OF MANUFACTURING THE COMPOSITE PANELS

FIELD

The present disclosure relates generally to core structures for composite panels of an aircraft, to composite panels and aircraft including the core structures, and to methods of manufacturing the composite panels.

BACKGROUND

Aircraft generally include a vertical stabilizer, which may be attached to a tail portion, or region, of the aircraft and may be utilized to provide side-to-side stability to the aircraft. The vertical stabilizer may include a composite panel, which may define a vertical tail cap that defines a leading top corner of the vertical stabilizer. The location and shape of the composite panel dictate that, during operation of the aircraft, wind, pressure, and/or drag forces exerted on the composite panel may be quite large. Thus, the composite panel must be structurally robust. However, the composite panel also may be utilized to house and/or to contain an aircraft antenna, and electromagnetic waves emitted or received by the antenna may travel through the composite panel. Under these conditions, it may be desirable to decrease an amount of material that the electromagnetic waves must pass through, as they travel through the composite panel, in order to decrease electromagnetic interference for the aircraft antenna. These two factors may compete against one another, with structural requirements dictating the use of more and/or thicker materials for the composite panel, while electromagnetic interference (EMI) requirements dictate less and/or thinner materials to maximize the performance and efficiency of the antenna signals. Thus, there exists a need for improved core structures for improved core structures for composite panels of an aircraft, for composite panels, and aircraft that include the core structures, and/or for methods of manufacturing composite panels.

SUMMARY

Core structures for composite panels of an aircraft, composite panels and aircraft including the core structures, and methods of manufacturing the composite panels are disclosed herein. The core structures include a first side, a second side, and a connecting region that interconnects an upper portion of the first side with an upper portion of the second side. The first side, the second side, and the connecting region at least partially define an antenna housing, which defines a housing volume configured to contain an aircraft antenna of the aircraft, and an electromagnetic wave transmission region, which is configured to permit electromagnetic waves to pass therethrough. The electromagnetic wave transmission region defines a plurality of kite-shaped voids arranged in a repeating pattern. The plurality of kite-shaped voids is bounded by a corresponding plurality of walls. At least 10% of the corresponding plurality of walls extends at least substantially perpendicular to a surface that bounds the electromagnetic wave transmission region.

The aircraft includes a fuselage, at least one wing, at least one horizontal stabilizer, and a vertical stabilizer. The vertical stabilizer extends from the fuselage and includes a composite panel that includes the core structure and at least one composite skin extending across an external surface of the core structure.

The methods include forming the core structure via an additive manufacturing process. The methods also include operatively attaching the composite skin to the core structure to manufacture the composite panel.

DESCRIPTION

FIGS. 1-9 provide illustrative, non-exclusive examples of core structures 120 and/or of aircraft 10, composite panels 75, vertical tail caps 100, and/or vertical stabilizers 50 that include core structure 120, and/or of methods 200 of manufacturing composite panels 75, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 1:
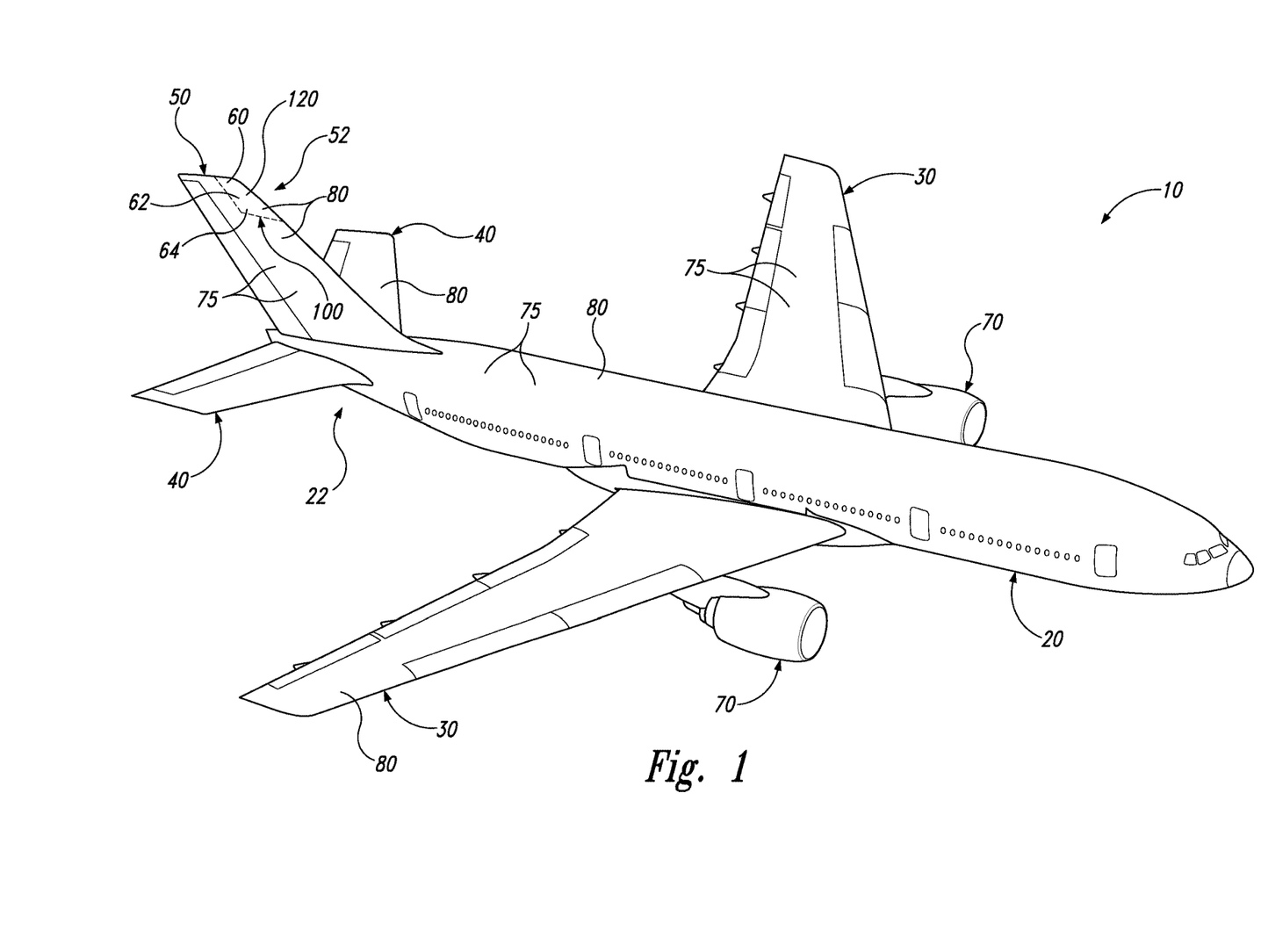
FIG. 1 is a schematic illustration of an aircraft that may include and/or utilize vertical stabilizers, composite panels, vertical tail caps, and/or core structures, according to the present disclosure.
Figure 2:
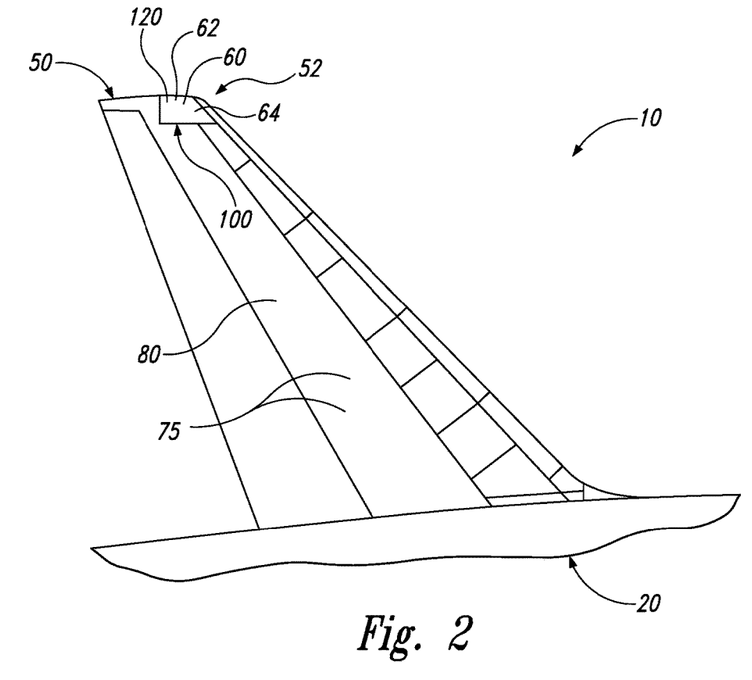
FIG. 2 is a schematic illustration of a vertical stabilizer for an aircraft that may include and/or utilize a composite panel, a vertical tail cap, and/or a core structure, according to the present disclosure.
Figure 3:
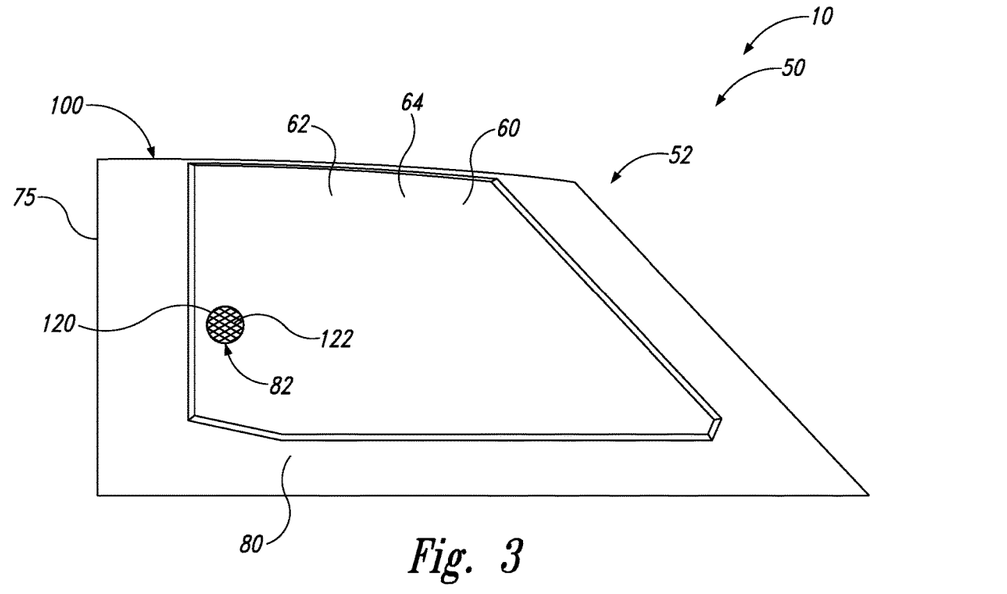
FIG. 3 is a schematic illustration of a composite panel, in the form of a vertical tail cap, that may include and/or utilize core structures, according to the present disclosure.
Figure 4:
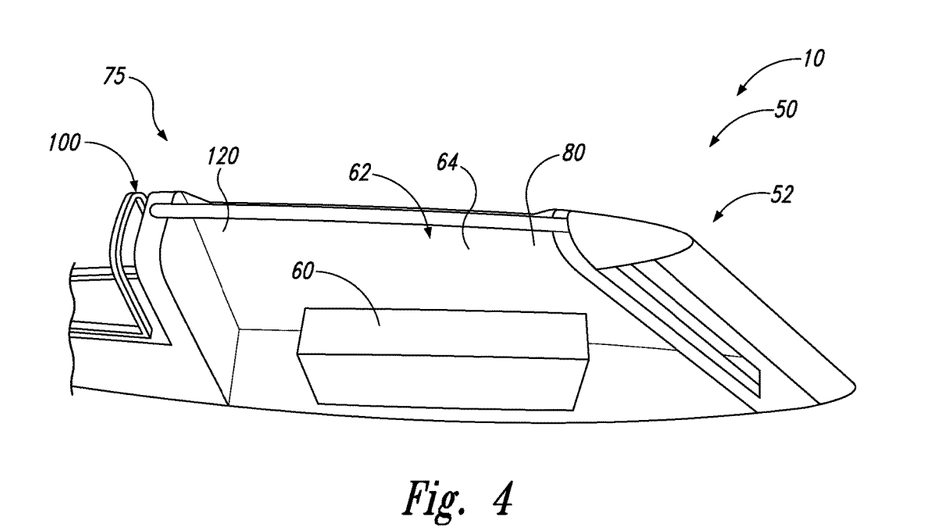
FIG. 4 is another schematic illustration of a composite panel, in the form of a vertical tail cap, that may include and/or utilize core structures, according to the present disclosure.

FIG. 1 is a schematic illustration of an aircraft 10 that may include and/or utilize vertical stabilizers 50, composite panels 75, vertical tail caps 100, and/or core structures 120, according to the present disclosure. FIG. 2 is a schematic illustration of a vertical stabilizer 50 for an aircraft 10 that may include and/or utilize composite panels 75, vertical tail caps 100, and/or core structures 120, according to the present disclosure. FIGS. 3-4 are schematic illustrations of a composite panel 75, in the form of vertical tail caps 100, that may include and/or utilize core structures 120, according to the present disclosure. Composite panels 75 may be referred to herein as forming, defining, and/or being a fairing, or a fairing surface, for aircraft 10.

As illustrated in FIG. 1, aircraft 10 includes a fuselage 20 and at least one wing 30 that extends from fuselage 20. Aircraft 10 also includes at least one horizontal stabilizer 40 extending from the fuselage, or from a tail region 22 of the fuselage, and a vertical stabilizer 50 extending from the fuselage, or from tail region 22. Aircraft 10 also may include one or more engines 70, which may be attached to wings 30. A composite skin 80 may cover and/or define a majority of an external surface of aircraft 10.

As illustrated in FIGS. 1-4, vertical stabilizer 50 includes a composite panel 75. Composite panel 75 may define vertical tail cap 100, which may form and/or define a top leading corner, or region, 52 of the vertical stabilizer. Composite panel 75 includes a core structure 120 that is coated and/or covered by composite skin 80. Stated another way, composite skin 80 may be attached and/or adhered to core structure 120 to form and/or define composite panel 75. As perhaps best illustrated in FIG. 4, within which composite skin 80 is illustrated as transparent, composite panel 75 and/or core structure 120 thereof at least partially defines an antenna housing 62 that defines a housing volume 64, which may contain an aircraft antenna 60.

As discussed, composite skin 80 may cover and/or define a majority of the external surface of aircraft 10. This may include covering a majority, or even an entirety, of the external surface of vertical tail cap 100. However, FIG. 3 includes a cutaway region 82, within which composite skin 80 has been removed, to illustrate that core structure 120 underlies, or supports, the composite skin to form and/or define composite panel 75. Stated another way, and as illustrated in FIG. 3 and discussed in more detail herein with reference to FIGS. 5-8, composite skin 80 may cover, extend across, and/or be operatively attached to an external surface 122 of core structure 120 to form and/or define composite panel 75.

Figure 5:
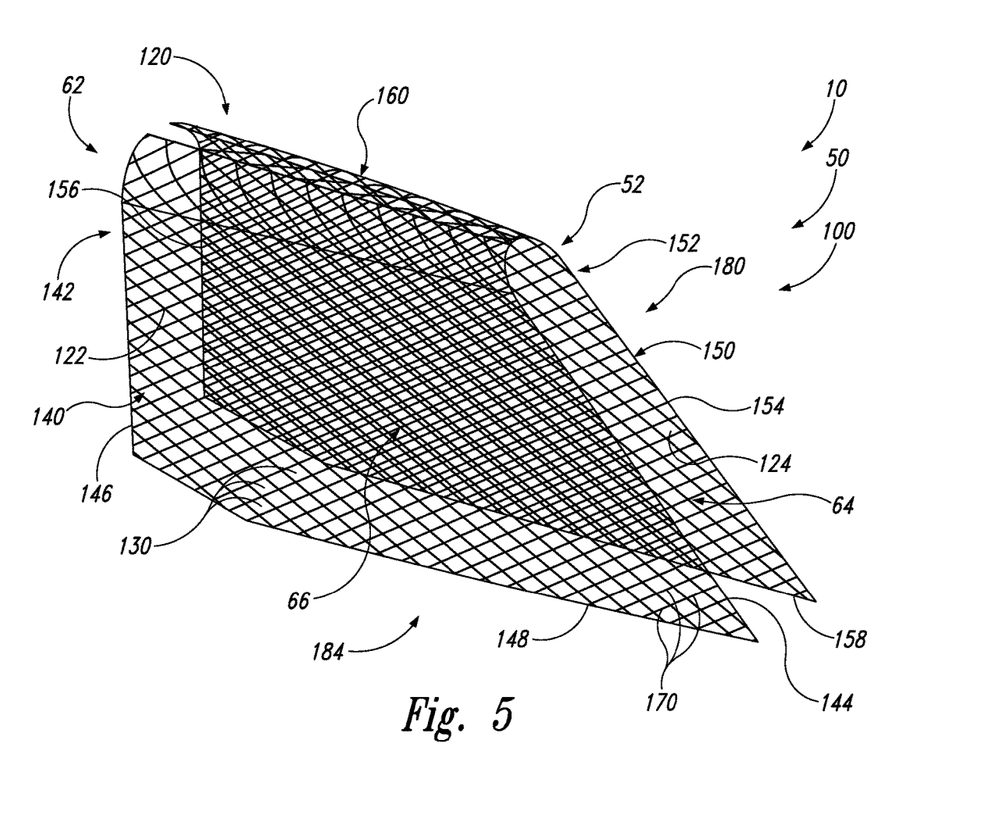
FIG. 5 is a schematic illustration of an example of a core structure according to the present disclosure.
Figure 6:
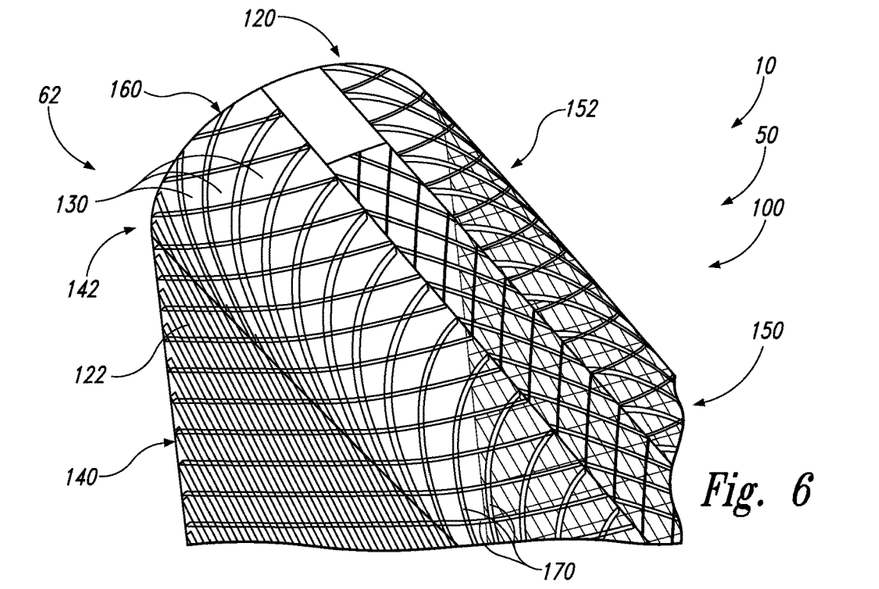
FIG. 6 is a more detailed view of a portion of the core structure of FIG. 5.
Figure 7:
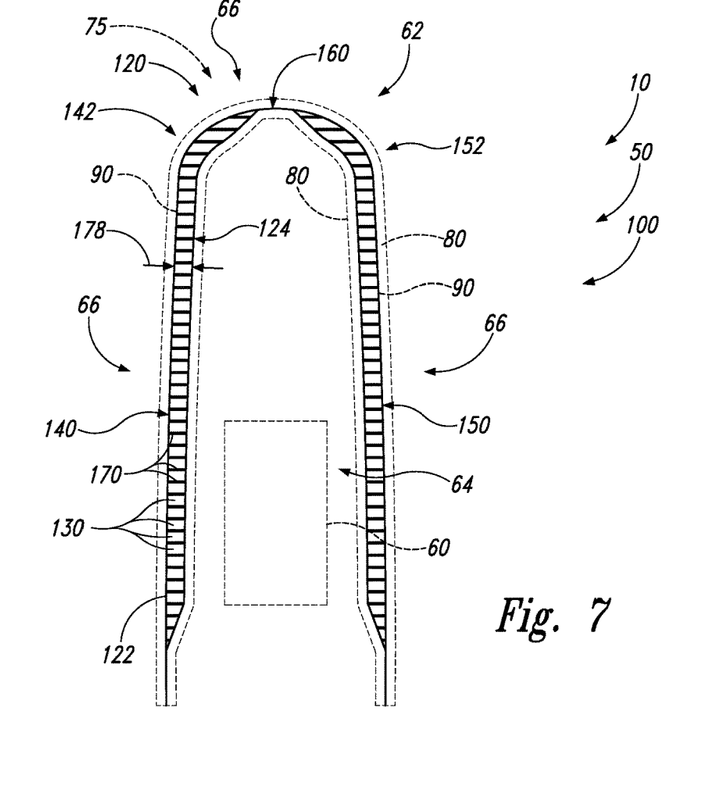
FIG. 7 is a transverse cross-sectional view of the core structure of FIGS. 5-6.
Figure 8:
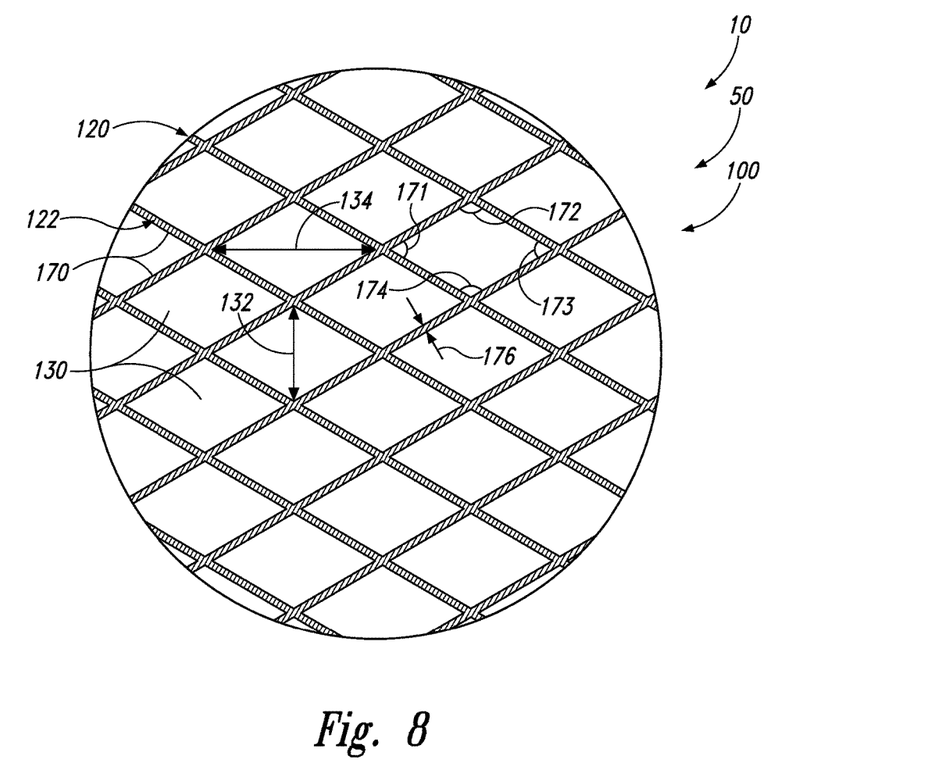
FIG. 8 is a more detailed view illustrating an example of kite-shaped voids that may be defined by core structures, according to the present disclosure.

FIG. 5 is a schematic illustration of an example of a core structure 120 according to the present disclosure, while FIG. 6 is a more detailed view of a portion of the core structure of FIG. 5. FIG. 7 is a transverse cross-sectional view of the core structure of FIGS. 5-6 and illustrates a transverse cross-sectional shape of the core structure. FIG. 8 is a more detailed view illustrating an example of kite-shaped voids 130 that may be defined by core structures 120, according to the present disclosure.

FIGS. 5-8 may include and/or be more detailed and/or less schematic illustrations of core structures 120, composite panels 75, vertical tail caps 100, vertical stabilizers 50, and/or components thereof that are illustrated in FIGS. 1-4. Any of the structures, functions, and/or features that are discussed herein with reference to core structures 120, composite panels 75, vertical tail caps 100, and/or vertical stabilizers 50 of FIGS. 5-8 may be included in and/or utilized with aircraft 10 and/or components thereof of FIGS. 1-4 without departing from the scope of the present disclosure. Similarly, any of the structures, functions, and/or features that are discussed herein with reference to aircraft 10 and/or components thereof of FIGS. 1-4 may be included in and/or utilized with core structures 120, composite panels 75, vertical tail caps 100, and/or vertical stabilizers 50 of FIGS. 5-8 without departing from the scope of the present disclosure.

As illustrated collectively by FIGS. 5-7, core structure 120 includes a first side 140, a second side 150, and a connecting region 160. Connecting region 160 interconnects an upper portion 142 of first side 140 with an upper portion 152 of second side 150. As discussed herein with reference to FIGS. 1-4, core structure 120, including first side 140, second side 150, and connecting region 160 thereof, at least partially defines an antenna housing 62 that defines a housing volume 64 configured to contain an aircraft antenna 60, as perhaps best illustrated in FIGS. 4 and 7.

As perhaps best illustrated in FIG. 7, first side 140, second side 150, and connecting region 160 together define an electromagnetic wave transmission region 66. Electromagnetic wave transmission region 66 may be a portion of core structure 120 through which a majority of electromagnetic waves, which may be utilized by aircraft antenna 60, pass and/or are conveyed. Stated another way, electromagnetic wave transmission region 66 may be configured to permit electromagnetic waves to pass both into and out of housing volume 64. It is within the scope of the present disclosure that electromagnetic wave transmission region 66 may include and/or be any suitable portion and/or region of core structure 120. As examples, electromagnetic wave transmission region 66 may include at least a fraction, a majority, at least 10%, at least 20%, at least 30%, at least 40%, at least 50%, at least 60%, at least 70%, at least 80%, at least 90%, at least 95%, at least 99%, or 100% of first side 140, of second side 150, of connecting region 160, and/or of an external surface 122 of the core structure that is defined by first side 140, second side 150, and/or connecting region 160.

Electromagnetic wave transmission region 66 may form and/or define a plurality of kite-shaped voids, or open spaces, 130. Kite-shaped voids 130 may extend between an internal surface 124 of core structure 120, as illustrated in FIGS. 5 and 7, and external surface 122. Stated another way, kite-shaped voids 130 may include and/or be apertures, openings, and/or gaps that may extend through first side 140, second side 150, and/or connecting region 160. Kite-shaped voids 130 may be arranged in a repeating pattern, in a regular pattern, and/or array, as illustrated. Within the repeating pattern, the kite-shaped voids may repeat in a regular and/or predictable manner.

As illustrated in FIGS. 5-8 and perhaps best illustrated in FIGS. 7-8, kite-shaped voids 130 may be bounded by a corresponding plurality of walls 170. Walls 170 may be oriented, within core structure 120, such that at least a threshold fraction of the corresponding plurality of walls 170 extends perpendicular, or at least substantially perpendicular, to a surface that bounds the electromagnetic wave transmission region 66. Examples of the threshold fraction include at least 10%, at least 20%, at least 30%, at least 40%, at least 50%, at least 60%, at least 70%, at least 80%, at least 90%, at least 95%, at least 99%, or 100% of the corresponding plurality of walls. Examples of the surface that bounds the electromagnetic wave transmission region 66 include internal surface 122, external surface 124, and/or a surface that is defined by composite skin 80 when the composite skin covers core structure 120.

As discussed herein, it may be desirable to construct composite panels 75 for aircraft 10 such that the composite panels are structurally robust and also such that the composite panels include a decrease in potential for absorption of and/or interaction with the electromagnetic waves that travel therethrough. As also discussed, these two goals may be somewhat contradictory, or competing, as increasing an amount of material that defines the composite panel generally will result in a more structurally robust composite panel but also will result in an increase in electromagnetic interference. In contrast, decreasing the amount of material that defines the composite panel generally will result in a decrease in electromagnetic interference but also may result in a less structurally robust composite panel.

However, and as discussed, core structures 120 disclosed herein utilize walls 170 that are perpendicular to the surface that bounds electromagnetic wave transmission region 66. As such, walls 170 present a small cross-sectional area to electromagnetic waves that pass through kite-shaped voids 130 when compared to prior art composite panels that may include walls that do not extend perpendicular to the surface that bounds a corresponding electromagnetic wave transmission region and/or that do not include kite-shaped voids 130. Stated another way, the presence of kite-shaped voids 130, together with the orientation of walls 170, within core structures 120 may permit core structures 120, according to the present disclosure, to provide a significant, desired, and/or necessary mechanical strength, compressive strength, and/or crush strength while, at the same time, decreasing an amount of material that electromagnetic waves must travel through when compared to the prior art. Walls 170 and/or kite-shaped voids 130 that are defined thereby may be sized to define a waveguide for electromagnetic wave transmission therethrough, further improving electromagnetic wave transmission over the prior art.

Core structure 120 may include any suitable structure that includes first side 140, second side 150, and connecting region 160 and/or that defines kite-shaped voids 130. As an example, core structure 120 may include and/or be a unitary, or a monolithic, structure. As a more specific example, core structure 120 may be formed and/or defined with, via, and/or utilizing an additive manufacturing process. Additive manufacturing processes may permit, or may more readily permit, core structure 120 to be fabricated such that walls 170 are perpendicular to the surface that bounds the electromagnetic wave transmission region when compared to more conventional manufacturing processes, such as composite layup processes and/or subtractive manufacturing processes.

Connecting region 160 may interconnect first side 140 and second side 150 in any suitable manner. As an example, and as illustrated in FIGS. 5-8, core structure 120 may be configured such that first side 140 and second side 150 define opposed, or at least substantially opposed, sides of housing volume 64. As another example, core structure 120 may be configured such that connecting region 160 defines an upper side, or an upper extent, of housing volume 64. Stated another way, first side 140, second side 150, and connecting region 160 together may define, or at least partially define, at least three sides of housing volume 64. As yet another example, and as illustrated in FIG. 7, a transverse cross-sectional shape of core structure 120, as taken through first side 140, second side 150, and connecting region 160, may be U-shaped, or at least substantially U-shaped.

As discussed, kite-shaped voids 130 generally are kite-shaped. Stated another way, kite-shaped voids 130 are quadrilaterals that include two pairs of adjacent sides of equal length. More specific examples of shapes for kite-shaped voids 130 include a rhombus, or diamond, shape. Such kite-shaped voids 130 are quadrilaterals in which all four sides are of equal length. It is within the scope of the present disclosure that kite-shaped voids 130 additionally or alternatively may be referred to herein as and/or may be quadrilateral-shaped voids, parallelogram-shaped voids, trapezoidal-shaped voids, and/or polygon-shaped voids.

It is within the scope of the present disclosure that a size, a shape, perimeter, and/or an aspect ratio of each kite-shaped void 130 in the plurality of kite-shaped voids 130 may be the same. Stated another way, the size, shape, perimeter, and/or aspect ratio of each kite-shaped void 130 in the plurality of kite-shaped voids 130 may be equal to the size, shape, perimeter, and/or aspect ratio of each other kite-shaped void 130 in the plurality of kite-shaped voids 130. Alternatively, it is also within the scope of the present disclosure the size, shape, perimeter, and/or aspect ratio of at least one kite-shaped void 130 in the plurality of kite-shaped voids 130 may differ from the size, shape, perimeter, and/or aspect ratio of at least one other kite-shaped void 130 in the plurality of kite-shaped voids 130.

The size, shape, and/or aspect ratio of the plurality of kite-shaped voids 130 may be selected and/or defined based upon any suitable criteria. As an example, the size, shape, and/or aspect ratio of a given kite-shaped void 130 may be selected and/or defined based, at least in part, on a desired strength, a desired mechanical strength, and/or a desired compressive strength of a region of the composite panel that includes the given kite-shaped void 130. This may include increasing a number of kite-shaped voids 130 and/or decreasing the size and/or shape of the given kite-shaped void 130 in regions where a higher strength, mechanical strength, and/or compressive strength is needed and/or desired.

As a more specific example, and as illustrated in FIG. 8, a width, or an average width, 132 of a given, or of each, kite-shaped void 130 may be at least 3 millimeters (mm), at least 4 mm, at least 5 mm, at least 6 mm, at least 7 mm, at least 8 mm, at least 9 mm, at least 10 mm, at least 12 mm, at least 14 mm, and/or at least 16 mm. Additionally or alternatively, width 132 may be at most 30 mm, at most 28 mm, at most 26 mm, at most 24 mm, at most 22 mm, at most 20 mm, at most 18 mm, at most 16 mm, at most 14 mm, at most 12 mm, at most 10 mm, and/or at most 8 mm.

As another more specific example, a length, or an average length, 134 of the given, or of each, kite-shaped void 130 may be at least 6 mm, at least 8 mm, at least 10 mm, at least 12 mm, at least 14 mm, at least 16 mm, at least 18 mm, at least 20 mm, at least 22 mm, at least 24 mm, at least 26 mm, at least 28 mm, and/or at least 30 mm. Additionally or alternatively, length 134 may be at most 50 mm, at most 45 mm, at most 40 mm, at most 35 mm, at most 30 mm, at most 28 mm, at most 26 mm, at most 24 mm, at most 22 mm, and/or at most 20 mm. The aspect ratio of kite-shaped voids 130 may be defined as a ratio of length 134 to width 132.

As yet another more specific example, each kite-shaped void 130, or walls 170 that define each kite-shaped void 130, may define a first included angle 171, a second included angle 172, a third included angle 173, and a fourth included angle 174. First included angle 171 and third included angle 173 may be opposed to one another, may be equal to one another, and/or may have vertices that define length 134. Similarly, second included angle 172 and fourth included angle 174 may be opposed to one another, may be equal to one another, and/or may have vertices that define width 132. The sum of first included angle 171, second included angle 172, third included angle 173, and fourth included angle 174 may be equal, or at least substantially equal, to 360 degrees.

Examples of first included angle 171, of second included angle 172, of third included angle 173, and/or of fourth included angle 174 include angles of at least 10 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, and/or at least 120 degrees. Additional examples include angles of at most 170 degrees, at most 160 degrees, at most 150 degrees, at most 140 degrees, at most 130 degrees, at most 120 degrees, at most 110 degrees, at most 100 degrees, at most 90 degrees, at most 80 degrees, at most 70 degrees, at most 60 degrees, at most 50 degrees, and/or at most 40 degrees.

In the example of FIG. 8, kite-shaped voids 130 include a plurality of diamond-shaped voids that are equal, or at least substantially equal, in size. These diamond-shaped voids may include a first included angle 171 and a third included angle 173 of 60 degrees. These diamond-shaped voids also may include a second included angle 172 and a fourth included angle 174 of 120 degrees. Width 132 may be at least substantially equal to 0.5 inches, or 12.7 mm.

Walls 170 may have any suitable size and/or dimension that defines kite-shaped voids 130, that provides a desired amount of mechanical strength, compressive strength, and/or crush strength for composite panels 75, and/or that provides a desired level of electromagnetic wave transmission therepast. As illustrated in FIG. 8, walls 170 may define a wall thickness, or an average wall thickness, 176, which may be defined between adjacent kite-shaped voids 130. Examples of wall thickness 176 include wall thicknesses of at least 0.25 mm, at least 0.5 mm, at least 0.75 mm, at least 1 mm, at least 1.25 mm, at least 1.5 mm, at least 1.75 mm, and/or at least 2 mm. Additional examples of wall thickness 176 include wall thicknesses of at most 3 mm, at most 2.75 mm, at most 2.5 mm, at most 2.25 mm, at most 2 mm, at most 1.75 mm, at most 1.5 mm, at most 1.25 mm at most 1 mm, at most 0.75 mm, and/or at most 0.5 mm.

As illustrated in FIG. 7, walls 170 additionally or alternatively may define a wall height, or an average wall height, 178. Wall height 178 may be measured perpendicular to the surface that bounds the electromagnetic wave transmission region. Additionally or alternatively, wall height 178 may be measured between external surface 122 and internal surface 124 of core structure 120. Examples of wall height 178 include wall heights of at least 5 mm, at least 7.5 mm, at least 10 mm, at least 15 mm, at least 20 mm, at least 25 mm, at least 30 mm, at least 35 mm, at least 40 mm, at least 45 mm, and/or at least 50 mm. Additional examples of wall height 178 include wall heights of at most 75 mm, at most 70 mm, at most 65 mm, at most 60 mm, at most 55 mm, at most 50 mm, at most 45 mm, at most 40 mm, at most 35 mm, at most 30 mm, at most 25 mm, at most 20 mm, at most 15 mm, and/or at most 10 mm.

Core structure 120 may be formed and/or defined by any suitable material and/or materials. As examples, core structure 120 may be formed and/or defined by one or more of a polymeric material, a polyetherimide, a poly (aryl) ether ketone (with or without functional reinforcements, additives, or functional additives), and/or an aerospace-grade thermoplastic. As another example, core structure 120 may be formed and/or defined by a material that is suitable to be utilized in an additive manufacturing process that is utilized to form and/or define the core structure.

Core structure 120 may include one or more additives, or functional additives, which may be utilized to modify one or more properties of core structure 120 and/or to make core structure 120 more suitable for aerospace applications. Examples of such additives include fillers, fibers, whiskers, particles, and/or carbon nanotubes, such as may be utilized to decrease costs, to increase stiffness, to provide desired electrostatic properties, to provide a desired level of rigidity or toughness, and/or to provide a desired resistance to fracture and/or impact.

Turning now to FIG. 5, and as discussed herein with reference to FIGS. 1-4, core structure 120 may be configured to be operatively attached to, mounted within, and/or utilized within vertical stabilizer 50 of aircraft 10. With this in mind, core structure 120 may include a plurality of mounts, mounting regions, or mounting surfaces, configured to interface with corresponding, or complementary, surfaces of vertical stabilizer 50. As an example, core structure 120 may include a front mounting region 180 that may be defined by a first leading edge 144 of first side 140, by a second leading edge 154 of second side 150, and/or by connecting region 160. As another example, core structure 120 additionally or alternatively may include a rear mounting region 182 that may be defined by a first trailing edge 146 of first side 140, by a second trailing edge 156 of second side 150, and/or be connecting region 160. As yet another example, core structure 120 additionally or alternatively may include a lower mounting region 184 that may be defined by a first lower edge 148 of first side 140 and/or by a second lower edge 158 of second side 150.

Turning now to FIG. 7, and as discussed herein with reference to FIGS. 1-4, core structure 120 may be covered with one or more layers of composite skin 80 to form and/or define composite panel 75 of aircraft 10. As an example, and as illustrated in dashed lines, composite skin 80 may extend across and/or may cover external surface 122 of core structure 120. As another example, and as also illustrated in dashed lines, composite skin 80 may extend across and/or may cover internal surface 124 of core structure 120. When one or more composite skins 80 are operatively attached to core structure 120 to form and/or define composite panel 75, a film adhesive 90 may extend between core structure 120 and composite skins 80 and/or may adhere composite skins 80 to core structure 120. Composite skins 80 may be formed and/or defined by any suitable material and/or materials. As an example, composite skins 80 may include and/or be glass-epoxy composite skins 80.

Figure 9:
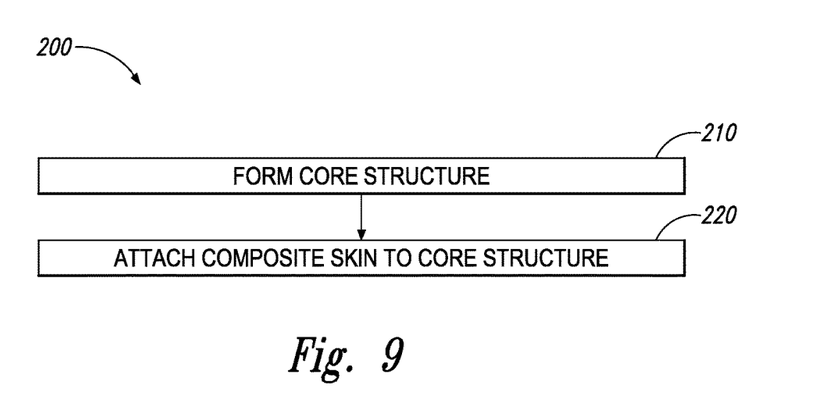
FIG. 9 is a flowchart depicting methods of manufacturing a composite panel of an aircraft, according to the present disclosure.

FIG. 9 is a flowchart depicting methods 200 of manufacturing a composite panel of an aircraft, according to the present disclosure. Methods 200 include forming a core structure at 210 and operatively attaching a composite skin to the core structure at 220. The forming at 210 may include forming any suitable core structure via an additive manufacturing process. Examples of the core structure are disclosed herein with reference to core structure 120 of FIGS. 1-8. The operatively attaching at 220 may include operatively attaching any suitable composite skin to any suitable portion of the core structure in any suitable manner. This may include operatively attaching the composite skin to an external surface of the core structure and/or operatively attaching the composite skin to an external surface of the core structure. The operatively attaching at 220 additionally or alternatively may include utilizing a film adhesive to operatively attach, or to adhere, the composite skin to the core structure.

Illustrative, non-exclusive examples of inventive subject matter according to the present disclosure are described in the following enumerated paragraphs:

A1. A core structure for a composite panel or fairing of an aircraft, the core structure comprising:
  a first side;
  a second side; and a connecting region that interconnects an upper portion of the first side with an upper portion of the second side;

wherein:

(i) the first side, the second side, and the connecting region at least partially define an antenna housing defining a housing volume configured to contain an aircraft antenna of the aircraft;

(ii) the first side, the second side, and the connecting region together define an electromagnetic wave transmission region configured to permit radar waves to pass therethrough;

(iii) the electromagnetic wave transmission region defines a plurality of kite-shaped voids arranged in a repeating pattern;

(iv) the plurality of kite-shaped voids is bounded by a corresponding plurality of walls; and (v) at least 10% of the corresponding plurality of walls extends perpendicular, or at least substantially perpendicular, to a surface that bounds the electromagnetic wave transmission region.

A2. The core structure of paragraph A1, wherein each kite-shaped void in the plurality of kite-shaped voids is at least one of:

(i) rhombus-shaped; and (ii) diamond-shaped.

A3. The core structure of any of paragraphs A1-A2, wherein a shape of each kite-shaped void in the plurality of kite-shaped voids is equal, or at least substantially equal, to a shape of each other kite-shaped void in the plurality of kite-shaped voids.

A4. The core structure of any of paragraphs A1-A3, wherein a shape of at least one kite-shaped void in the plurality of kite-shaped voids differs from a shape of at least one other kite-shaped void in the plurality of kite-shaped voids.

A5. The core structure of any of paragraphs A1-A4, wherein a shape of a given kite-shaped void in the plurality of kite-shaped voids is selected based, at least in part, on a desired compressive strength of a region of the composite panel or fairing that includes the given kite-shaped void.

A6. The core structure of any of paragraphs A1-A5, wherein a size of each kite-shaped void in the plurality of kite-shaped voids is equal, or at least substantially equal, to a size of each other kite-shaped void in the plurality of kite-shaped voids.

A7. The core structure of any of paragraphs A1-A6, wherein a size of at least one kite-shaped void in the plurality of kite-shaped voids differs from a size of at least one other kite-shaped void in the plurality of kite-shaped voids.

A8. The core structure of any of paragraphs A1-A7, wherein a size of a given kite-shaped void in the plurality of kite-shaped voids is selected based, at least in part, on a desired compressive strength of a region of the composite panel or fairing that includes the given kite-shaped void.

A9. The core structure of any of paragraphs A1-A8, wherein an aspect ratio of each kite-shaped void in the plurality of kite-shaped voids is equal, or at least substantially equal, to an aspect ratio of each other kite-shaped void in the plurality of kite-shaped voids.

A10. The core structure of any of paragraphs A1-A9, wherein an aspect ratio of at least one kite-shaped void in the plurality of kite-shaped voids differs from an aspect ratio of at least one other kite-shaped void in the plurality of kite-shaped voids.

A11. The core structure of any of paragraphs A1-A10, wherein an aspect ratio of a given kite-shaped void in the plurality of kite-shaped voids is selected based, at least in part, on a desired compressive strength of a region of the composite panel or fairing that includes the given kite-shaped void.

A12. The core structure of any of paragraphs A1-A11, wherein an average width, or a width of each kite-shaped void, of the plurality of kite-shaped voids is at least one of:

(i) at least 3 millimeters (mm), at least 4 mm, at least 5 mm, at least 6 mm, at least 7 mm, at least 8 mm, at least 9 mm, at least 10 mm, at least 12 mm, at least 14 mm, or at least 16 mm; and (ii) at most 30 mm, at most 28 mm, at most 26 mm, at most 24 mm, at most 22 mm, at most 20 mm, at most 18 mm, at most 16 mm, at most 14 mm, at most 12 mm, at most 10 mm, or at most 8 mm.

A13. The core structure of any of paragraphs A1-A12, wherein an average length, or a length of each kite-shaped void, of the plurality of kite-shaped voids is at least one of:

(i) at least 6 millimeters (mm), at least 8 mm, at least 10 mm, at least 12 mm, at least 14 mm, at least 16 mm, at least 18 mm, at least 20 mm, at least 22 mm, at least 24 mm, at least 26 mm, at least 28 mm, or at least 30 mm; and (ii) at most 50 mm, at most 45 mm, at most 40 mm, at most 35 mm, at most 30 mm, at most 28 mm, at most 26 mm, at most 24 mm, at most 22 mm, or at most 20 mm.

A14. The core structure of any of paragraphs A1-A13, wherein each kite-shaped void of the plurality of kite-shaped voids defines a first included angle, a second included angle, a third included angle, and a fourth included angle.

A15. The core structure of paragraph A14, wherein the first included angle and the third included angle at least one of:

(i) are opposed to one another;

(ii) are equal to one another; and (iii) have vertices that define a/the length of each kite-shaped void.

A16. The core structure of any of paragraphs A14-A15, wherein the second included angle and the fourth included angle at least one of:

(i) are opposed to one another;

(ii) are equal to one another; and (iii) have vertices that define a/the width of each kite-shaped void.

A17. The core structure of any of paragraphs A14-A16, wherein a sum of the first included angle, the second included angle, the third included angle, and the fourth included angle is equal, or at least substantially equal, to 360 degrees.

A18. The core structure of any of paragraphs A14-A17, wherein at least one of the first included angle, the second included angle, the third included angle, and the fourth included angle is at least one of:

(i) at least 10 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, or at least 120 degrees; and (ii) at most 170 degrees, at most 160 degrees, at most 150 degrees, at most 140 degrees, at most 130 degrees, at most 120 degrees, at most 110 degrees, at most 100 degrees, at most 90 degrees, at most 80 degrees, at most 70 degrees, at most 60 degrees, at most 50 degrees, or at most 40 degrees.

A19. The core structure of any of paragraphs A1-A18, wherein each of the plurality of kite-shaped voids is sized to define a waveguide for electromagnetic wave transmission therethrough.

A20. The core structure of any of paragraphs A1-A19, wherein at least 20%, at least 30%, at least 40%, at least 50%, at least 60%, at least 70%, at least 80%, at least 90%, at least 95%, at least 99%, or 100% of the corresponding plurality of walls extends perpendicular, or at least substantially perpendicular, to the surface that bounds the electromagnetic wave transmission region.

A21. The core structure of any of paragraphs A1-A20, wherein the corresponding plurality of walls defines an average wall thickness, optionally that is defined between adjacent kite-shaped voids in the plurality of kite-shaped voids.

A22. The core structure of paragraph A21, wherein the average wall thickness is at least one of:
(i) at least 0.25 millimeters (mm), at least 0.5 mm, at least 0.75 mm, at least 1 mm, at least 1.25 mm, at least 1.5 mm, at least 1.75 mm, or at least 2 mm; and
(ii) at most 3 mm, at most 2.75 mm, at most 2.5 mm, at most 2.25 mm, at most 2 mm, at most 1.75 mm, at most 1.5 mm, at most 1.25 mm at most 1 mm, at most 0.75 mm, or at most 0.5 mm.

A23. The core structure of any of paragraphs A1-A22, wherein the corresponding plurality of walls defines an average wall height, optionally that is measured perpendicular to the surface that bounds the electromagnetic wave transmission region.

A24. The core structure of paragraph A23, wherein the average wall height is at least one of:
(i) at least 5 millimeters (mm), at least 7.5 mm, at least 10 mm, at least 15 mm, at least 20 mm, at least 25 mm, at least 30 mm, at least 35 mm, at least 40 mm, at least 45 mm, or at least 50 mm; and
(ii) at most 75 mm, at most 70 mm, at most 65 mm, at most 60 mm, at most 55 mm, at most 50 mm, at most 45 mm, at most 40 mm, at most 35 mm, at most 30 mm, at most 25 mm, at most 20 mm, at most 15 mm, or at most 10 mm.

A25. The core structure of any of paragraphs A1-A24, wherein the electromagnetic wave transmission region is configured to permit electromagnetic waves to pass both into and out of the housing volume.

A26. The core structure of any of paragraphs A1-A25, wherein the core structure is at least one of a unitary structure and a monolithic structure.

A27. The core structure of any of paragraphs A1-A26, wherein the core structure is formed via an additive manufacturing process.

A28. The core structure of any of paragraphs A1-A27, wherein the first side and the second side at least partially define opposed, or at least substantially opposed, sides of the housing volume.

A29. The core structure of any of paragraphs A1-A28, wherein the first side, the second side, and the connecting region at least partially define at least three sides of the housing volume.

A30. The core structure of any of paragraphs A1-A29, wherein a transverse-cross-sectional shape of the core structure, as taken through the first side, the second side, and the connecting region, is U-shaped, or at least substantially U-shaped.

A31. The core structure of any of paragraphs A1-A30, wherein the core structure is formed from at least one of a polymeric material, a polyetherimide, a poly (aryl) ether ketone, and an aerospace-grade thermoplastic.

A32. The core structure of any of paragraphs A1-A31, wherein the core structure further includes at least one of:
(i) a front mounting region defined by a first leading edge of the first side, by a second leading edge of the second side, and by the connecting region;
(ii) a rear mounting region defined by a first trailing edge of the first side, by a second trailing edge of the second side, and by the connecting region; and
(iii) a lower mounting region defined by a first lower edge of the first side and by a second lower edge of the second side.

B1. A composite panel or fairing of an aircraft, the composite panel or fairing comprising:
the core structure of any of paragraphs A1-A32; and
at least one composite skin at least one of:
(i) extending across an external surface of the core structure; and
(ii) extending across an internal surface of the core structure.

B2. The composite panel or fairing of paragraph B1, wherein the at least one composite skin defines the surface that bounds the electromagnetic wave transmission region.

B3. The composite panel or fairing of any of paragraphs B1-B2, wherein the at least one composite skin includes a glass-epoxy composite skin.

B4. The composite panel or fairing of any of paragraphs B1-B3, wherein the composite panel or fairing further includes a film adhesive that adheres the core structure and the composite skin to one another.

C1. A vertical stabilizer of an aircraft including the composite panel or fairing of any of paragraphs B1-B4.

C2. The vertical stabilizer of paragraph C1, wherein the composite panel or fairing defines a leading top corner of the vertical stabilizer.

D1. An aircraft, comprising:
a fuselage;
at least one wing extending from the fuselage;
at least one horizontal stabilizer extending from the fuselage; and
the vertical stabilizer of any of paragraphs C1-C2 extending from the fuselage.

D2. The aircraft of paragraph D1, wherein the aircraft further includes an aircraft antenna positioned within the housing volume.

E1. A method of manufacturing a composite panel or fairing of an aircraft, the method comprising:
forming, via an additive manufacturing process, the core structure of any of paragraphs A1-A32; and
operatively attaching a composite skin to the core structure.

E2. The method of paragraph E1, wherein the operatively attaching includes operatively attaching the composite skin to at least one of:
(i) an external surface of the core structure; and
(ii) an internal surface of the core structure.

E3. The method of paragraph E1, wherein the operatively attaching includes utilizing a film adhesive to operatively attach the composite skin to the core structure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A core structure (120) for a composite panel (75) of an aircraft (10), the core structure (120) comprising:
   a first side (140);
   a second side (150); and
   a connecting region (160) that interconnects an upper portion (142) of the first side (140) with an upper portion (152) of the second side (150);
   wherein:
   (i) the first side (140), the second side (150), and the connecting region (160) at least partially define an antenna housing (62) defining a housing volume (64) configured to contain an aircraft antenna (60) of the aircraft (10);
   (ii) the first side (140), the second side (150), and the connecting region (160) together define an electromagnetic wave transmission region (66) configured to permit electromagnetic waves to pass therethrough;
   (iii) the electromagnetic wave transmission region (66) defines a plurality of kite-shaped voids (130) arranged in a repeating pattern;
   (iv) the plurality of kite-shaped voids (130) is bounded by a corresponding plurality of walls (170); and
   (v) at least 10% of the corresponding plurality of walls (170) extends at least substantially perpendicular to a surface (122/124) that bounds the electromagnetic wave transmission region (66).

2. The core structure (120) of claim 1, wherein a shape of each kite-shaped void (130) in the plurality of kite-shaped voids (130) is at least substantially equal to a shape of each other kite-shaped void (130) in the plurality of kite-shaped voids (130).

3. The core structure (120) of claim 1, wherein a perimeter of each kite-shaped void (130) in the plurality of kite-shaped voids (130) is at least substantially equal to a perimeter of each other kite-shaped void (130) in the plurality of kite-shaped voids (130).

4. The core structure (120) of claim 1, wherein a shape of at least one kite-shaped void (130) in the plurality of kite-shaped voids (130) differs from a shape of at least one other kite-shaped void (130) in the plurality of kite-shaped voids (130).

5. The core structure (120) of claim 1, wherein a shape of a given kite-shaped void (130) in the plurality of kite-shaped voids (130) is selected based, at least in part, on a desired compressive strength of a region of the composite panel (75) that includes the given kite-shaped void (130).

6. The core structure (120) of claim 1, wherein an average width (132) of each kite-shaped void (130) of the plurality of kite-shaped voids (130) is at least 3 millimeters (mm) and at most 30 mm.

7. The core structure (120) of claim 1, wherein an average length (134) of each kite-shaped void (130) of the plurality of kite-shaped voids (130) is at least 6 millimeters (mm) and at most 50 mm.

8. The core structure (120) of claim 1, wherein each kite-shaped void (130) of the plurality of kite-shaped voids (130) defines a first included angle (171), a second included angle (172), a third included angle (173), and a fourth included angle (174), wherein:
- (i) the first included angle (171) and the third included angle (173) are opposed to one another and equal to one another; and
- (ii) the second included angle (172) and the fourth included angle (174) are opposed to one another and equal to one another.

9. The core structure (120) of claim 1, wherein each of the plurality of kite-shaped voids (130) is sized to define a waveguide for electromagnetic wave transmission therethrough.

10. The core structure (120) of claim 1, wherein at least 80% of the corresponding plurality of walls (170) extend at least substantially perpendicular to the surface (122/124) that bounds the electromagnetic wave transmission region (66).

11. The core structure (120) of claim 1, wherein the corresponding plurality of walls (170) defines an average wall thickness (176) that is defined between adjacent kite-shaped voids (130) in the plurality of kite-shaped voids (130), wherein the average wall thickness (176) is at least 0.25 millimeters (mm) and at most 3 mm.

12. The core structure (120) of claim 1, wherein the corresponding plurality of walls (170) defines an average wall height (178) that is measured perpendicular to the surface (122/124) that bounds the electromagnetic wave transmission region (66), wherein the average wall height (178) is at least 5 millimeters (mm) and at most 75 mm.

13. The core structure (120) of claim 1, wherein the core structure (120) is at least one of a unitary structure and a monolithic structure.

14. The core structure (120) of claim 1, wherein the first side (140) and the second side (150) at least partially define at least substantially opposed sides of the housing volume (64).

15. The core structure (120) of claim 1, wherein a transverse cross-sectional shape of the core structure (120), as taken through the first side (140), the second side (150), and the connecting region (160), is U-shaped, or at least substantially U-shaped.

16. An aircraft (10), comprising:
a fuselage (20);
at least one wing (30) extending from the fuselage (20);
at least one horizontal stabilizer (40) extending from the fuselage (20); and
a vertical stabilizer (50) extending from the fuselage (20) and including a composite panel (75), wherein the composite panel (75) includes:
- (i) the core structure (120) of claim 1; and
- (ii) at least one composite skin (80) extending across an external surface (122) of the core structure (120).

17. The aircraft (10) of claim 16, wherein the aircraft (10) further includes an aircraft antenna (60) positioned within the housing volume (64).

18. A method (200) of manufacturing a composite panel (75) of an aircraft (10), the method comprising:
forming (210), via an additive manufacturing process, the core structure (120) of claim 1; and
operatively attaching (220) a composite skin (80) to the core structure (120).

19. The method (200) of claim 18, wherein the operatively attaching (220) the composite skin (80) includes operatively attaching (220) the composite skin (80) to at least one of:
- (i) an external surface (122) of the core structure (120); and
- (ii) an internal surface (124) of the core structure (120).

20. The method (200) of claim 18, wherein the operatively attaching (220) the composite skin (80) includes utilizing a film adhesive (90) to operatively attach the composite skin (80) to the core structure (120).

* * * * *